United States Patent [19]
Burstyn

[11] Patent Number: 5,309,188
[45] Date of Patent: May 3, 1994

[54] COUPLING PRISM ASSEMBLY AND PROJECTION SYSTEM USING THE SAME

[75] Inventor: Herschel C. Burstyn, Plainsboro, N.J.

[73] Assignee: David Sarnoff Research Center, Inc., Princeton, N.J.

[21] Appl. No.: 65,149

[22] Filed: May 21, 1993

[51] Int. Cl.$^5$ .................. G03B 21/28; G02B 27/10
[52] U.S. Cl. ........................ 353/33; 353/81; 359/40
[58] Field of Search ............ 353/31, 33, 34, 81.82, 353/30; 359/40, 639, 640, 833, 834, 837, 41

[56] References Cited

U.S. PATENT DOCUMENTS

| | | | |
|---|---|---|---|
| T.938,006 | 9/1975 | Stephany | 359/41 |
| 4,913,528 | 4/1990 | Hasegawa | 353/33 |
| 4,943,155 | 7/1990 | Cross, Jr. | 353/33 |
| 4,969,730 | 11/1990 | VanderBrandt | 353/31 |
| 5,066,101 | 11/1991 | Aoki et al. | 359/833 |

Primary Examiner—William A. Cuchlinski, Jr.
Assistant Examiner—William C. Dowling
Attorney, Agent, or Firm—William J. Burke

[57] ABSTRACT

A coupling prism assembly between a light valve and a projection lens includes a right angle prism and a wedge prism. The right angle prism has two sides of substantially the same length and a hypotenuse side. The wedge prism has a side which is adjacent the hypotenuse side of the right angle prism. The light valve is adjacent one of the two sides of the right angle prism and the projection lens is adjacent the other of the two sides of the right angle prism. Light enters the coupling prism assembly through a second side of the wedge prism, passes in substantially a straight line through the wedge prism and right angle prism to the light valve where the light is modulated. The modulated light passes back into the right angle prism and is reflected by the hypotenuse side into the projection lens. In a color projection system, the light is split into three color components. A separate light valve is provided to modulate each color component which is directed to a projection lens. A separate coupling prism assembly is adjacent each light valve to direct each color component to the light valve and direct the modulated light to the projection prism. A color combining prism assembly is provided between the coupling prism assemblies and the projection lens to combine the three modulated beams into a single beam which is directed into the projection lens.

9 Claims, 1 Drawing Sheet

COUPLING PRISM ASSEMBLY AND PROJECTION SYSTEM USING THE SAME This invention was made with Government support under Contract No. MDA972-90-C-0008 awarded by DARPA. The Government has certain rights in this invention.

FIELD OF THE INVENTION

The invention relates to a coupling prism for a video projection system, and, more particularly to a color video projection system and an optical coupling prism used therein.

BACKGROUND

In one type of a video projection system, a beam of light is projected onto means for modulating the light in accordance with a video signal. The modulated light beam is then directed through a projection lens onto a video screen. For a color projection system, the light source is split into its three color components, i.e., red, blue and green. Each color component of the light beam is then individually modulated. The three modulated components are then directed simultaneously through the projection lens and onto the screen.

One type of light modulator is a light valve having a blazed surface. A blazed surface is a surface made up of a plurality of small surfaces each at an angle less than ninety degrees with respect to the axis of the device. Also, the light valve includes means for selectively reflecting the light beam impinging on the blazed surface to the projection lens, or directing the light away from the projection lens so as to modulate the light. A type of light valve which has been developed for this purpose is a deformable mirror device which is formed of a plurality of mirrors which can be simultaneously pivoted to change the angle of deflection of light impinging on the mirrors. With a light valve having a blazed surface, the light from the light source is directed onto the blazed surface and is reflected from the blazed surface to the projection lens. Thus, the system heretofore used had the means for directing the light onto the light valve surface and the projection lens at the same side of the light valve, i.e., the side having the blazed surface. To permit the incoming beam of light and the outgoing beam of light from interfering with each other, it has been necessary to provide a relatively large space between the light valve and each of the means for directing the light beam onto the light valve and the projection lens. This is particularly true for color projection systems which have three separate light valves, one for each color. In order to make the projection system more compact, it is desirable to have a system in which the light directing means and the projection lens can be placed as close as possible to the light valve and still not have interference between the incoming and outgoing light beams.

SUMMARY OF THE INVENTION

The invention is directed to a light projection system comprising a light valve having a surface which is adapted to modulated light directed thereon, a lens for directing a light beam passing therethrough onto the surface of the light valve, and a projection lens adapted to receive light reflected by the light valve. A coupling prism is between the light valve, lens and projection lens. The coupling prism is adapted to direct light from the lens onto the surface of the light valve and direct light reflected form the light valve to the projection lens. The coupling prism has a plurality of surfaces with the lens being adjacent one surface, the light valve being adjacent a second surface and the projection lens being opposite a third surface.

The invention is also directed to a light projection system comprising means for generating a beam of light and directing the beam along a path. Means are provided for splitting the beam into red, blue and green components and a separate light valve is provided for modulating each color component. Each light valve has a surface which is adapted to reflect light directed thereon. A projection lens is adapted to receive from each of the light valves all of the modulated color components of the beam. A separate coupling prism assembly is adjacent each of the light valves. Each of the coupling prism assemblies is adapted to direct its respective color component of the beam onto the light valve and direct the reflected modulated beam from the light valve to the projection lens. A color combining prism assembly is between the projection lens and each of the coupling prism assemblies for receiving each of the modulated color components of the beam and combining the modulated color components into a single beam which is directed into the projection lens.

DETAILED DESCRIPTION

Figure 1:
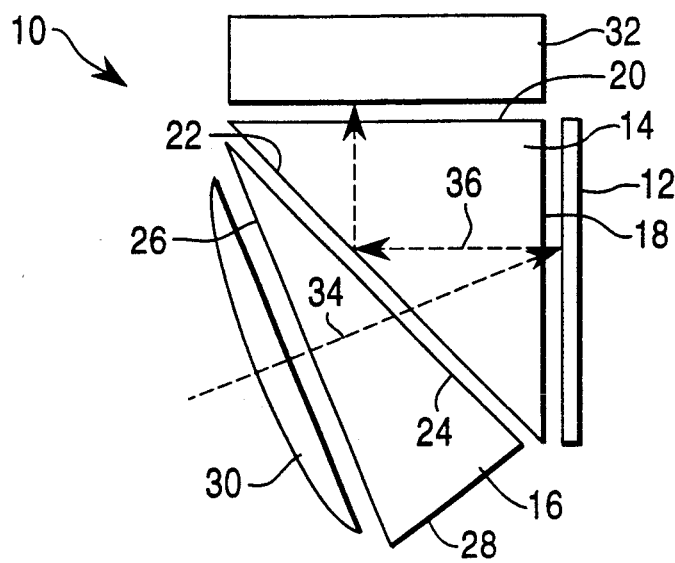
FIG. 1 is a schematic view of one form of the coupling prism assembly of the invention.

In FIG. 1, a coupling prism assembly of the invention is generally designated as 10. The coupling prism system 10 is mounted adjacent a light valve 12, which can be a deformable mirror device. The coupling prism assembly 10 comprises a right angle prism 14 and a wedge prism 16. The right angle prism has two sides 18 and 20 at right angles to each other and of equal length, and a third or hypotenuse side 22. The wedge prism 16 also has three sides 24, 26 and 28. The sides 24 and 26 are long with the side 24 being adjacent the hypotenuse side 22 of the right angle prism 14. The other long side 26 is the light emitting side of the prism 16. The angle between the two sides 24 and 26 is such that the central axis of the beam of light entering the prism 16 is perpendicular to the light emitting side 26.

A lens 30 is mounted adjacent the light entrance side 26 of the wedge prism 14. The lens 30 is designed to direct a light beam into the wedge prism 14. The light valve 12 is mounted adjacent the side 18 of the right angle prism 14 which is directly opposite the light emitting side 26 of the wedge prism 14. A projection lens 32 is mounted adjacent the side 20 of the right angle prism 14. The side 20 serves as the light emitting surface of the coupling prism assembly 10.

In the operation of the coupling lens apparatus 10, a beam of light, indicated by the lines 34, is directed through the lens 28 into the light emitting side 26 of the wedge prism 14. The beam of light can be either non-collimated, or can be collimated by the lens 30. The geometry of the wedge prism 16 is such that all of the angles in the illumination cone are below the critical angle for the wedge prism 16. Thus, the beam of light passes along substantially a straight line through the wedge prism 16 and through the right angle prism 14 to the light valve 12, which is against the side 18 of the right angle prism 14. The light beam is modulated by the light valve 12 with the modulated light beam, indicated by the lines 36, being reflected back into the right angle prism 14 toward the hypotenuse side 22 thereof. However, for the modulated light beam 36 which is reflected back into the right angle prism 14, the situation is different from that of the incoming beam of light 34. The smallest angle of incidence upon the hypotenuse side 22 of the right angle prism 14 is 45°. For a glass having an index of refraction of 1.5, the critical angle is 41.8°. Thus, all of the rays of the modulated beam of light 36 exceed the critical angle and are thus totally internally reflected. Therefore, for the modulated beam of light 36, the hypotenuse side 22 of the right angle lens 14 acts as a mirror and reflects all of the modulated light through 90°. The modulated light beam 36 then passes out of the right angle prism 14 through the side 20 and into the projection lens 32 which is adjacent the side 20.

Thus, in the system of the invention, the light beam directed into the light valve 12 and the modulated beam leaving the light valve 12 do not interfere with each other. The spacing between the two beams is such that all constraints upon the size of the projection lens 32 are removed. Also the lens 30 at the entrance of the coupling prism assembly 10 is close to the light valve 12. Since the cone angle of the light beam is fixed by the magnification requirements of the system, the lens 30 can have a smaller diameter than in a system which does not include the coupling prism assembly 10. Thus, the coupling prism assembly 10 allows the lens 30, light valve 12 and projection lens 32 to be placed closer together and also allows the use of a smaller lens 30 and a smaller projection lens 32 so that the size of the overall system is made smaller. In spite of the size of the system being smaller, the light beam directed into the system and the modulated beam of light do not interfere with each other.

Figure 2:
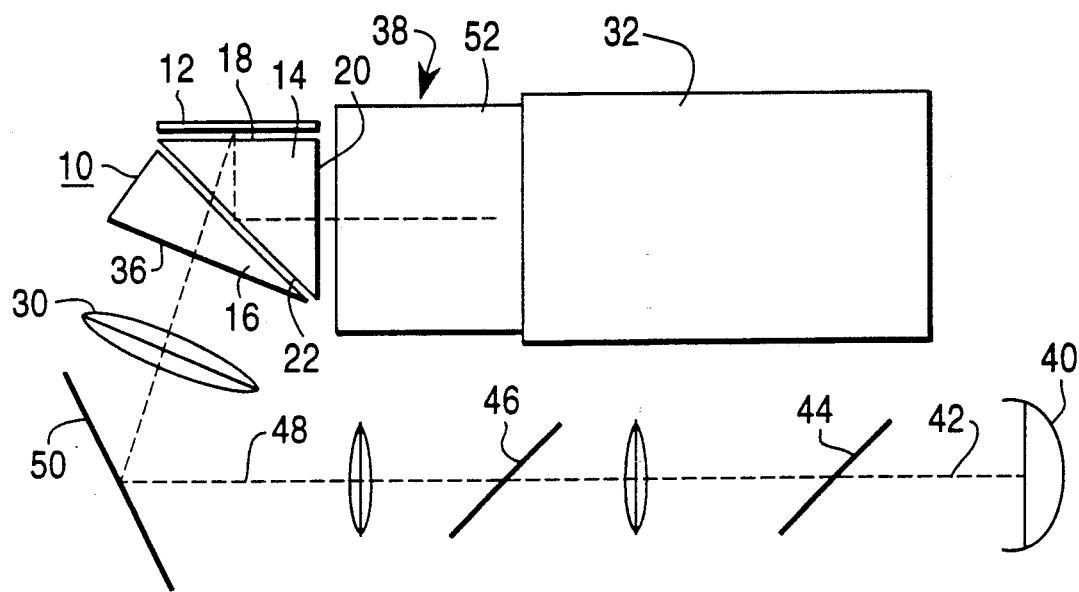
FIG. 2 is a side schematic view of a color video projection system using the coupling prism of the invention.
Figure 3:
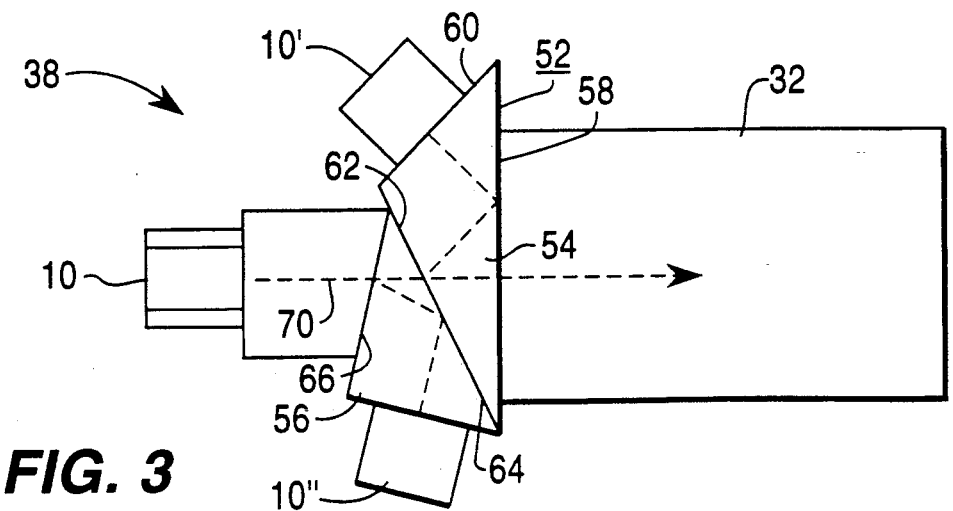
FIG. 3 is a top schematic view of the color video projection system shown in FIG. 2.

In FIGS. 2 and 3, there is shown a color projection system, generally designated as 38, which uses the coupling prism assembly 10. The color projection system 38 comprises a light source 40, which can generate and emits a beam of light indicated by the line 42. The beam of light 42 can be either a collimated beam of light or an non-collimated beam of light. The beam of light 42 passes through two beam splitters 44 and 46. One of the beam splitters, such as the beam splitter 44 splits off the blue component of beam 42 and the other beam splitter 46 splits off the red component of the beam 42. The remaining component of the beam 42, which is indicated by the line 48, is the green component of the beam 42. The blue, red and green components of the beam 42 each then follow a similar path. For ease of description, only the path of the green component 48 will be described in detail with it being understood that the blue and red components following similar paths.

The green component 48 of the beam is then reflected by a mirror 50 through a lens 30 into a coupling prism assembly 10. As described above, the coupling prism assembly 10 includes a right angle prism 14 and a wedge prism 16. A light valve 12 is adjacent one side 18 of the right angle prism 14, and a projection lens 32 is adjacent the side 20 of the right angle prism 14. However, a color combining prism assembly 52 is between the side 20 of the right angle prism 14 and the projection lens 32. The green component 48 of the beam is directed by the lens 30 into the light receiving surface 36 of the wedge prism 16. As described above, the light beam 48 passes through the wedge prism 16 and the right angle prism 14 into the light valve 12. The light valve 12 modulates the light beam 48 and directs the modulated beam of light back into the right angle prism 14. The modulated beam of light is reflected by the hypotenuse side 22 of the right angle prism 14 through 90° so that it passes out of the coupling prism assembly 10 through the side 20 of the right angle prism 14 and then into the color combining prism assembly 52.

As shown in FIG. 3, there is a separate coupling prism assembly for each of the blue, red and green components of the light beam 42. The coupling prism assembly for the green component is indicated as 10, the coupling prism assembly for the blue component is indicated as 10', and the coupling prism assembly for the red component is indicated as 10''. Each of the blue portion and red components of the light beam 42 passes through its respective coupling prism assembly 10' and 10'' respectively in the same manner as described above with respect to the green component 48. Each of the coupling prism assemblies 10, 10' and 10'' is adjacent a separate portion of the color combining prism assembly 52 so as to direct its respective modulated beam of light into the color combining prism assembly 52.

The color combining prism assembly 52 includes first and second prisms 54 and 56. First prism 54 has a first surface 58 from which the combined light is emitted and against which is mounted the projection lens 32. The first prism 54 has a second surface 60 against which the coupling prism assembly 10' for the blue component is mounted, and a third surface 62 against which a first surface 64 of the second prism 56 is mounted. The second prism 56 has a second surface 66 adjacent which the coupling prism assembly 10 of the green component is mounted, and a third surface 68 against which the coupling prism assembly 10'' of the red component is mounted.

The angles of the first and second surfaces 64 and 66 of the second prism 56 and the first and third surfaces 58 and 62 of the first prism 54 are such that the modulated light beam from the coupling prism assembly 10 of the green component of the beam is directed along a straight axis 70 through the second and first prism 56 and 54 into the projection lens 32. The angles of the surfaces of the second prism 56 are such that the modulated light beam from the coupling prism assembly 10'' for the red component of the beam passes through the third surface 68 into the second prism 56, is then reflected at 90° by the first surface 64 toward the second surface 66, and then is reflected by the second surface 66 along the axis 70 of the green component of the beam. The red component of the beam is thus combined with the green component and passes through the second prism 56 and first prism 54 into the projection lens 32. The angle of the sides of the first prism 54 are such that the modulated light beam form the coupling prism assembly 10' of the blue component passes through the second surface 60 into the first prism 54. The beam is then reflected by 90° by the first surface 58 toward the third surface 62. The third surface 62 reflects the beam along the axis 70 so that the blue component of the beam is combined with the red component and green component. The combined beam then passes through the first prism 54 into the projection lens 32. Thus, the color combining prism assembly 52 combines the three color components of the beam into a single beam and directs the combined beam along an axis into the projection lens 32.

Thus, there is provided a color projection system 38 which emits a beam of light and splits the beam into three separate color components. Each of the color components of the beam is directed by a coupling prism assembly 10, 10' and 10" respectively onto a light valve which modulates the respective beams of light. The three modulated beams of light are then directed by the coupling prism assemblies 10, 10' and 10" into a color combining prism assembly 52. The color combining prism assembly 52 combines the three modulated beams into a single beam along an axis and directs the combined beam into a projection lens. The coupling prism assemblies 10, 10' and 10", and the color combining prism assembly 52 permit the various parts of the projection system 38 to be placed in close vicinity to each other and to be made relatively small in size. This provides a projection system 38 which is relatively small and compact.

Modifications of the embodiments of the invention may occur to one skilled in the art. Such and like modifications are intended to be within the spirit and scope of the invention, and the appended claims.

What is claimed is:

1. A light projection system comprising:
   a light valve having a surface which is adapted to modulate light directed thereon;
   a lens for directing a light beam passing therethrough onto the surface of the light valve;
   a projection lens adapted to receive the modulated light beam from the light valve; and
   a coupling prism assembly comprising a right angle prism and wedge prism between the lens, light valve and projection lens and adapted to direct light from the lens onto the surface of the light valve and direct the modulated light beam from the light valve to the projection lens, the right angle prism having first and second sides of substantially the same length and a hypotenuse side, the wedge prism having two relatively long sides and a short side with one of the long sides of the wedge prism being adjacent the hypotenuse side of the right angle prism, the coupling prism having a plurality of surfaces with the lens being adjacent one surface, the light valve being adjacent a second surface and the projection lens being adjacent a third surface.

2. The system of claim 1 wherein the lens is adjacent the other long side of the wedge prism, the light valve is adjacent the first side of the right angle prism and the projection lens is adjacent the second side of the right angle prism.

3. The system of claim 2 wherein the index of refraction and angles between the sides of the wedge prism and right angle prism are such that light directed into the wedge lens from the lens passes in a relatively straight line through the wedge prism and right angle prism to the light valve and the modulated light from the light valve passes back into the right angle prism and is reflected by the hypotenuse side of the right angle prism through substantially 90° and passes out of the second side into the projection lens.

4. A light projection system comprising:
   means for generating a beam of light and directing the beam along a path;
   means for splitting the light beam into red, blue and green components;
   a separate light valve for modulating each color component, each of said light valves having a surface which is adapted to reflect light directed thereon;
   a projection lens adapted to receive from each of the light valves all of the modulated color components of the beams;
   a separate coupling prism assembly adjacent each of the light valves, each of the coupling prism assemblies being adapted to direct its respective color component onto the light valve and direct the reflected modulated beam from the light valve to the projection lens; and
   a color combining prism assembly between the projections lens and each of the coupling prism assemblies for receiving each of the modulated color components of the beam and combining the modulated color components into a single beam which is directed into the projection lens.

5. The system of claim 4 wherein each of the coupling prism assemblies comprises a right angle prism and a wedge prism.

6. The system of claim 5 wherein in each coupling prism assembly the right angle prism has first and second sides of substantially the same length and a hypotenuse side, the wedge prism has two relatively long sides and a short side and one of the long sides of the wedge prism is adjacent the hypotenuse side of the right angle prism.

7. The system of claim 6 wherein each light valve is adjacent the first side of the right angle prism of its respective coupling prism assembly, the color combining prism assembly is adjacent the second side of the right angle prism assembly, and the color portion of the light beam enters the coupling prism assembly through the other long side of the wedge prism.

8. The system of claim 7 wherein the index of refraction and the angles between the sides of the wedge prism and right angle prism of each coupling prism assembly are such that light directed into the wedge prism passes in a substantially straight line through the wedge prism and right angle prism to the light valve, and the modulated light from the light valve passes back into the right angle prism and is reflected by the hypotenuse side of the right angle prism through substantially 90° and passes out of the second side of the right angle prism to the color combining prism assembly.

9. The system of claim 8 wherein the color combining prism assembly comprises first and second prisms each having three sides, a first side of the first prism being adjacent the projection lens, one of the coupling prism assemblies being adjacent a second side of the first prism and a first side of the second prism being adjacent the third side of the first prism, a separate coupling prism assembly being adjacent each of the second and third sides of the second prism.

* * * * *